(12) United States Patent
Kim et al.

(10) Patent No.: US 10,382,223 B2
(45) Date of Patent: Aug. 13, 2019

(54) SCHEME FOR SUPPORTING WIRELESS TRANSMISSION TAKING INTO ACCOUNT QOS OF USB APPLICATION DATA

(71) Applicants: Samsung Electronics Co., Ltd., Gyeonggi-do (KR); Ajou University Industry-Academic Cooperation Foundation, Gyeonggi-do (KR)

(72) Inventors: Jun-Hyung Kim, Gyeonggi-do (KR); Young-Bae Ko, Gyeonggi-do (KR); Jong-Hyo Lee, Gyeonggi-do (KR); Keun-Woo Lim, Gyeonggi-do (KR); Woo-Sung Jung, Gyeonggi-do (KR); Joo-Yeol Lee, Gyeonggi-do (KR)

(73) Assignees: Samsung Electronics Co., Ltd (KR); Ajou University Industry-Academic Cooperation Foundation (KR)

(*) Notice: Subject to any disclaimer, the term of this patent is extended or adjusted under 35 U.S.C. 154(b) by 225 days.

(21) Appl. No.: 15/033,814

(22) PCT Filed: Dec. 24, 2013

(86) PCT No.: PCT/KR2013/012103
§ 371 (c)(1),
(2) Date: May 2, 2016

(87) PCT Pub. No.: WO2015/064838
PCT Pub. Date: May 7, 2015

(65) Prior Publication Data
US 2016/0285645 A1  Sep. 29, 2016

(30) Foreign Application Priority Data

Oct. 31, 2013  (KR) .......................... 10-2013-0131642

(51) Int. Cl.
*H04L 12/40* (2006.01)
*G06F 13/24* (2006.01)
(Continued)

(52) U.S. Cl.
CPC ........ *H04L 12/40065* (2013.01); *G06F 13/24* (2013.01); *G06F 13/385* (2013.01);
(Continued)

(58) Field of Classification Search
CPC ......... H04L 12/40058; H04L 12/40065; H04L 12/40143; G06F 13/24; G06F 13/385; G06F 13/4286
See application file for complete search history.

(56) References Cited

U.S. PATENT DOCUMENTS 7,987,302 B2  7/2011 Diepstraten et al.
2005/0025167 A1*  2/2005 Ishibashi ................. H04L 12/56
370/412

(Continued)

FOREIGN PATENT DOCUMENTS

EP         2501098       9/2012
WO   WO 2005/088915    9/2005

OTHER PUBLICATIONS

Ko, Jae-Hoon et al., Orthongonal signaling-based queue status investigation method in IEE 802.11. IEEE LCN'09, Oct. 2009 [online], [retreived on Sep. 7, 2018]. Retreived from the Internet <URL: https://chopin.postech.ac.kr/data/publication/717.pdf>.*

(Continued)

*Primary Examiner* — Eric T Oberly
(74) *Attorney, Agent, or Firm* — The Farrell Law Firm, P.C.

(57) ABSTRACT

Provided is a method and apparatus for wirelessly transmitting Universal Serial Bus (USB) application data by using an Enhanced Distributed Channel Access (EDCA) scheme that uses one or more Access Channels (ACs) having different priorities. The method includes receiving one or more USB application data from an USB application, dynamically assigning an AC through which the USB application data is to be transmitted, and transmitting the USB application data through the assigned AC.

17 Claims, 8 Drawing Sheets

(51) Int. Cl.
*G06F 13/38* (2006.01)
*G06F 13/42* (2006.01)

(52) U.S. Cl.
CPC .... *G06F 13/4286* (2013.01); *H04L 12/40058* (2013.01); *H04L 12/40143* (2013.01)

(56) References Cited

U.S. PATENT DOCUMENTS

| | | | |
|---|---|---|---|
| 2005/0135318 A1* | 6/2005 | Walton | H04L 12/66 370/338 |
| 2006/0277330 A1* | 12/2006 | Diepstraten | H04L 47/6215 710/40 |
| 2007/0066304 A1 | 3/2007 | Lee | |
| 2007/0110092 A1 | 5/2007 | Kangude et al. | |
| 2007/0189244 A1* | 8/2007 | del Prado Pavon | H04W 48/10 370/338 |
| 2007/0206552 A1* | 9/2007 | Yaqub | H04W 28/24 370/338 |
| 2008/0082709 A1* | 4/2008 | Lee | G06F 13/387 710/240 |
| 2008/0267203 A1* | 10/2008 | Curcio | H04L 49/90 370/412 |
| 2009/0172210 A1* | 7/2009 | Kesselman | H04L 47/805 710/16 |
| 2009/0232001 A1* | 9/2009 | Gong | H04L 47/10 370/236 |
| 2010/0069006 A1 | 3/2010 | Baek | |
| 2010/0180058 A1* | 7/2010 | Ihori | H04W 74/04 710/117 |
| 2010/0284380 A1* | 11/2010 | Banerjee | H04W 16/14 370/338 |
| 2011/0032834 A1 | 2/2011 | Kim et al. | |
| 2013/0024902 A1* | 1/2013 | Hason | H04N 21/64738 725/118 |
| 2013/0336251 A1* | 12/2013 | Park | H04W 74/0816 370/329 |
| 2014/0149611 A1* | 5/2014 | Huang | H04L 1/0001 710/33 |

OTHER PUBLICATIONS

PCT/ISA/210 Search Report issued on PCT/KR2013/012103 (pp. 3).

Lim, Keun-Woo et al., Design and implementation of adaptive WLAN mesh networks for video surveillance, Wireless Netw (2013) 19:1511-1524.

Kim, Min-Soo et al., EDCA-TM: IEEE 802.11e MAC Enhancement for Wireless Multi-hop Networks, Copyright 2009 IEEE, pp. 6.

Veres, Andras et al., Supporting Service Differentiation in Wireless Packet Networks Using Distributed Control, IEEE Journal on Selected Areas in Communications vol. 19, No. 10, Oct. 2001, Copyright 2001 IEEE, pp. 2081-2093.

IEEE P802.11TM-2012, Part 11: Wireless LAN medium access control (MAC) and physical layer (PHY) specifications, pp. 2833.

\* cited by examiner

SCHEME FOR SUPPORTING WIRELESS TRANSMISSION TAKING INTO ACCOUNT QOS OF USB APPLICATION DATA

PRIORITY

This application is a National Phase Entry of PCT International Application No. PCT/KR2013/012103, which was filed on Dec. 24, 2013, and claims priority to Korean Patent Application No. 10-2013-0131642, which was filed on Oct. 31, 2013, the contents of each of which are incorporated herein by reference.

TECHNICAL FIELD

The present disclosure generally relates to a scheme for supporting wireless transmission of Universal Serial Bus (USB) data, and more particularly, to a scheme for supporting Wireless Fidelity (WiFi) transmission taking Quality of Service (QoS) into account.

BACKGROUND ART

Various studies and standardization have been conducted to transmit data of Universal Serial Bus (USB) applications through Wireless Fidelity (WiFi).

When a USB is used in a wired situation, direct communication is made between a USB host and a USB device. The direct communication between the USB host and the USB device statically assigns a given bandwidth, and may exclusively use the bandwidth in a wired situation and thus does not need to seriously consider a problem such as collision or packet drop.

In a wireless situation, physical USB bus connection, which is communication between the host and the USB device, may be replaced with wireless connection. In a wireless environment (for example, WiFi), however, a constant bandwidth cannot be guaranteed for any communication. This is because the wireless environment is shared with multiple neighboring devices and may have collision or packet drop caused by interference.

DISCLOSURE OF INVENTION

Technical Problem

Although restrictions exist due to natures of the wireless environment to transmit USB data in the wireless environment, study results or specific methods for transmitting USB data to meet QoS requirements in a WiFi environment have not yet been provided.

In particular, in USB data, for application data for file transmission, a high need exists to satisfy integrity conditions of transmission data. Therefore, a specific scheme for overcoming the foregoing restrictions in the wireless environment is needed.

The above information is presented as background information only to assist with an understanding of the present disclosure. No determination has been made, and no assertion is made, as to whether any of the above might be applicable as prior art with regard to the present disclosure.

An aspect of the present disclosure is to address at least the above-mentioned problems and/or disadvantages and to provide at least the advantages described below. Accordingly, an aspect of the present disclosure is to provide a scheme for transmitting USB data in a WiFi environment, taking QoS into account.

Another aspect of the present disclosure is to provide a scheme for classifying USB data depending to type to apply WiFi Enhanced Distributed Channel Access (EDCA) in transmission of the USB data.

Another aspect of the present disclosure is to provide a scheme for controlling assignment of an Access Category or Access Channel (AC) to be transmitted, depending on a type of USB data to be transmitted, in transmission of the USB data.

Further another aspect of the present disclosure is to provide a scheme for dynamically determining an AC to be used for data transmission through WiFi, by using queue state information of the AC, in transmission of USB data.

Solution to Problem

In accordance with an embodiment of the present disclosure, there is provided a method for wirelessly transmitting Universal Serial Bus (USB) application data by using an Enhanced Distributed Channel Access (EDCA) scheme that uses one or more Access Channels (ACs) having different priorities, the method including receiving one or more USB application data from an USB application, dynamically assigning an AC through which the USB application data is to be transmitted, and transmitting the USB application data through the assigned AC.

In accordance with another embodiment of the present disclosure, there is provided an apparatus for wirelessly transmitting USB application data by using an EDCA scheme that uses one or more ACs having different priorities, the apparatus including a PAL configured to receive one or more USB application data from an USB application and dynamically assign an AC through which the USB application data is to be transmitted and a WiFi EDCA unit configured to transmit the USB application data through the assigned AC.

Advantageous Effects of Invention

When USB data is transmitted through WiFi according to embodiments of the present disclosure, an AC to be applied to a WiFi EDCA scheme is dynamically assigned depending on a type of USB data, thereby improving a bulk data delivery ratio. Therefore, retransmission occurring in case of a transmission failure of the bulk data may be reduced and overhead needed for retransmission may be greatly reduced, and the reliability of bulk data transmission may be remarkably improved. As a result, the overall wireless environment used in wireless transmission of USB data may be efficiently used.

Moreover, the embodiments of the present disclosure guarantee small time delay also in transmission of interrupt data or isochronous data and reduce occurrence of jitter, thereby guaranteeing and improving the QoS of a USB application service such as a streaming service.

BRIEF DESCRIPTION OF DRAWINGS

The above and other objects, features and advantages of certain embodiments of the present disclosure will be more apparent from the following detailed description taken in conjunction with the accompanying drawings, in which.

Throughout the drawings, the same drawing reference numerals will be understood to refer to the same elements, features and structures.

MODE FOR THE INVENTION

Figure 1:
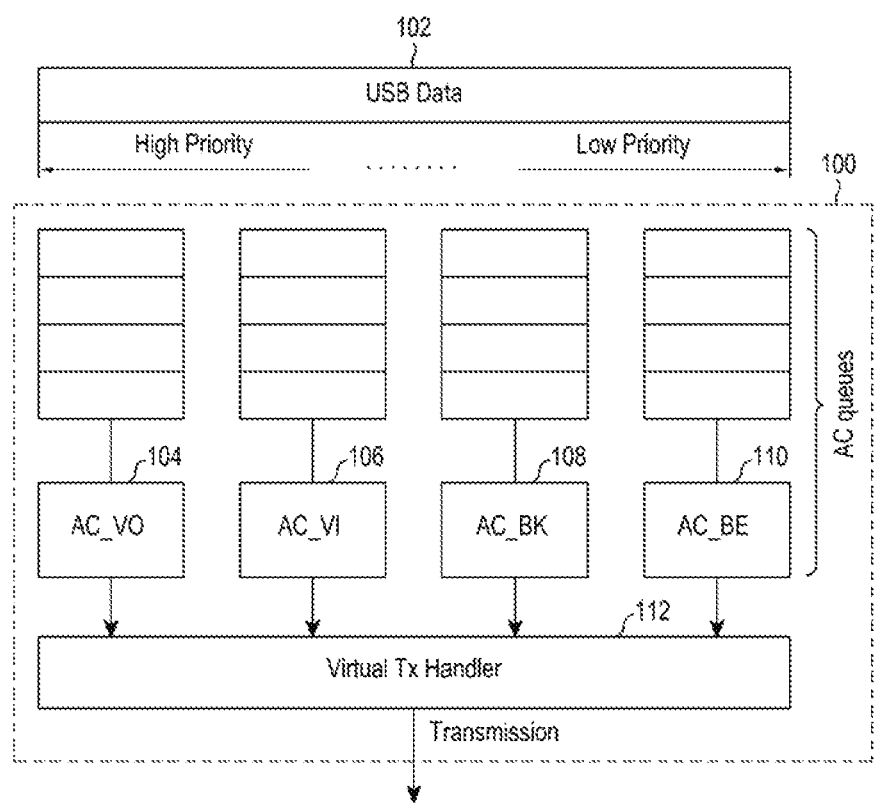
FIG. 1 is a schematic diagram illustrating a method for transmitting WiFi data on a priority basis by using an EDCA of an IEEE 802.11e system.

Hereinafter, embodiments of the present disclosure will now be described in detail with reference to the accompanying drawings. In describing the present disclosure, when a detailed description of the known functions or structures is determined to unnecessarily obscure the subject matter of the present disclosure the detailed description will be omitted. Furthermore, the following terms have been defined by taking their functions in the present disclosure into consideration and may be varied according to an intention of a user or an operator or practices. Accordingly, the definition of the terms should be made based on the contents of the entire specification.

Prior to a detailed description of the present disclosure, examples of interpretable meaning of several terms used in the specification will be provided. However, it should be noted that the terms are not limited to such examples.

Universal Serial Bus (USB) data refers to data used for a USB application, data generated by the USB application, or traffic of the data, and may be referred to as 'USB application data' or 'USB application'.

A USB device generates USB data and transmits the generated USB data to a USB host. However, the USB host may also transmit USB data to the USB device, and thus classification between the UBS device and the USB host is not strictly determined and may be determined variably according to the role of data transmission (transmission or reception).

"AC" refers to an Access Category or Access Channel of four types for transmission of data according to data Quality-of-Service (QoS)-based priority. The four AC types include AC_VO (Voice), AC_VI (Video), AC_BK (Background), and AC_BE (Best Effort), and in the following description, AC may be referred to as an access category or access channel.

Table 1 describes four types of traffic of USB data.

TABLE 1

| Traffic | Type | Description |
|---|---|---|
| INTERRUPT | Data Traffic | Transmit data upon occurrence of an event. Transmission rate requirements and the requirements of having to transmit data within a short time exist.Ex) Input data from a keyboard, a mouse, a game controller, or the like |
| ISOCHRONOUS | Data Traffic | Real-time or periodic data. This is not sensitive to data drop (error-tolerant), but is needed to be transmitted within a specific time. Ex) Streaming data such as video data, voice data, webcam data, or the like |
| BULK | Data Traffic | Bulky data. This is not sensitive to delay (delay-tolerant), but data integrity is important. Ex) Data for file transmission |
| CONTROL | Control Traffic | Control information for association between a USB device and a USB host or for data traffic transmission. |

There are four types of USB data, depending on the nature of traffic. USB data of three types, that is, INTERRUPT data, ISOCHRONOUS data, and BULK data, among the four types, correspond to data traffic.

INTERRUPT (or 'interrupt' or 'intrpt') data is used for transmission of an input or an output of a USB device. A USB device periodically senses generation of an input or an output, and if an input or an output is generated, data of the input or the output is transmitted as interrupt data. When the interrupt data is used, a result is transmitted in response to a particular event upon occurrence of the event, such that a predetermined transmission (Tx) rate needs to be guaranteed for the interrupt data and the interrupt data should be transmitted within as a short time as possible. This is because transmission delay of interrupt data is directly related to delay of an operation using the USB device, causing degradation of a User eXperience (UX).

The interrupt data may include input/output data generated from a USB device, for example, a keyboard, a mouse, a game controller, or the like. Thus, the amount of data generated is relatively small (when compared to the amount of other USB data).

ISOCHRONOUS (or 'isochronous' or 'isoch') data is used for transmission of video, voice, and so forth. The isochronous data is used to periodically transmit streaming data such as video, voice, or the like of a real-time camera, and somewhat data drop at a level that guarantees a UX may be accepted. Meanwhile, the isochronous data has the time requirement of having to be transmitted within a particular time, and otherwise, discontinuation of a streaming image occurs due to buffering, failing to support real-time properties or continuity.

The isochronous data may include image data generated from a USB device, such as a webcam.

BULK (or 'bulk') data is used to transmit a bulky file. The bulk data may be transmitted regardless of a transmission time instant or a transmission time required (that is, delay-tolerant), but for data integrity, a transmission rate needs to be about 100%. The USB device and the USB host that transmit the bulk data may perform data transmission while gradually increasing a data transmission speed as succeeding in data transmission. Thus, for the bulk data, a transmission rate varies over time, but in a wireless environment, radio resources for such a time-varying transmission rate are difficult to guarantee.

The bulk data may include file transmission data transmitted from a USB device, such as a Hard Disk Drive (HDD).

So far, three representative types of data traffic and examples thereof have been described. However, other types of data traffic may also exist. Other services and application data may also be applied as examples of the above-described three types of USB data.

CONTROL data, which does not correspond to data traffic and corresponds to control traffic, may exist, but this is little related to problems to be solved by the present disclosure and thus will not be described in detail.

FIG. 1 is a schematic diagram illustrating a method for transmitting WiFi data on a priority basis by using an Enhanced Distributed Channel Access (EDCA) scheme of an Institute of Electrical and Electronics Engineers (IEEE) 802.11e system.

In transmission of USB data through WiFi, an apparatus for performing transmission using data queuing and Radio Frequency (RF) enables data transmission to which QoS is applied in accordance with an IEEE 802.11e EDCA scheme.

In the EDCA scheme, priorities may be applied to different transmission of various types of data. The EDCA scheme may use four levels of ACs according to priorities.

The four levels of ACs are AC_VO (Voice), AC_VI (Video), AC_BK (Background), and AC_BE (Best Effort) in a priority-descending order. That is, among the four levels of ACs, the highest priority AC is AC_VO. AC_VO is a channel having the highest transmission rate and the lowest data drop probability. On the other hand, AC_BE is a channel having the lowest transmission rate and a relatively high data drop probability.

A WiFi EDCA (or WiFi MAC EDCA) unit 100 receives USB data 102 having a given priority and distributes the USB data 102 to four AC queues 104, 106, 108, and 110 on a priority basis, and wirelessly transmits the distributed data under control of a virtual Tx handler 112. The WiFi EDCA unit 100 may be a Distributed Coordination Function (DCF), depending on a type of a communication system.

Figure 2:
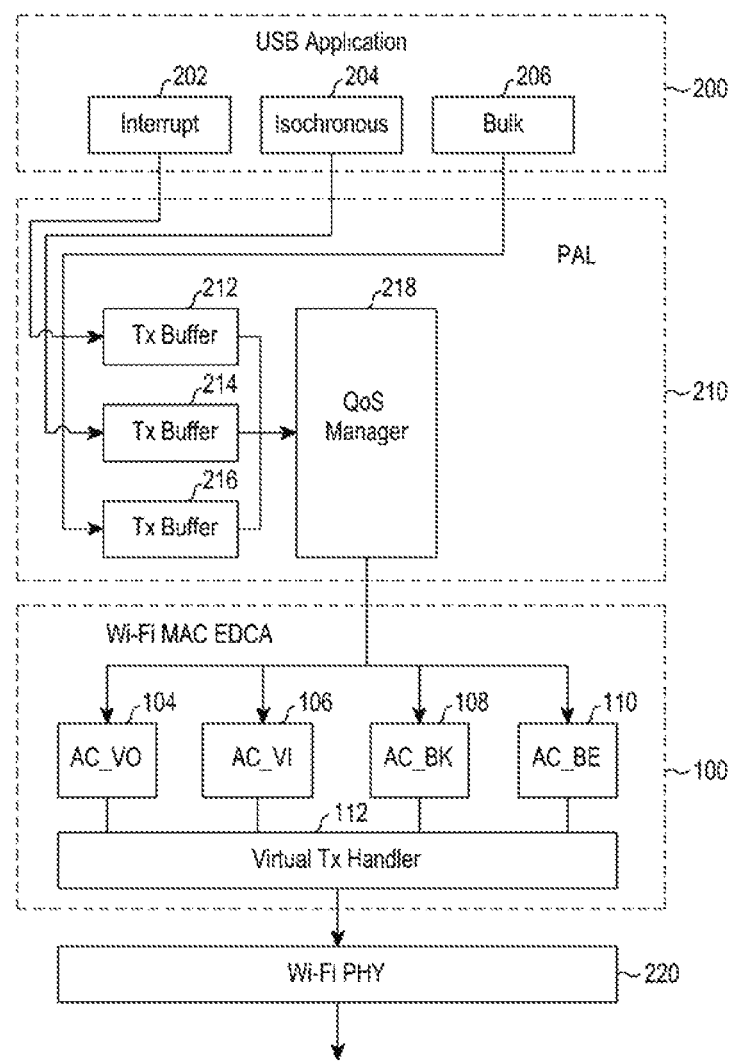
FIG. 2 is a schematic diagram illustrating a method for transmitting USB data through WiFi in view of a device according to an embodiment of the present disclosure.

FIG. 2 is a schematic diagram illustrating a method for transmitting USB data through WiFi in view of a device according to an embodiment of the present disclosure.

A USB device 200 including an USB application (for example, a USB device or a USB host) generates USB application data for transmission, such as interrupt data 202, isochronous data 204, or bulk data 206, and delivers the generated USB application data to a Protocol Adaptation Layer (PAL) 210 for WiFi transmission.

The PAL 210 receives the USB data 202, 204, or 206 from the USB device 200 and stores them in a transmission (Tx) buffer 212, 214, or 216. According to schemes proposed by embodiments of the present disclosure, a QoS manager 218 that may be provided in the PAL 210 determines priorities of the USB data stored in the Tx buffers 212, 214, and 216 or assigns an AC to be transmitted using an EDCA scheme and delivers USB data whose priority is determined (or which is assigned with an AC) to the WiFi EDCA unit 100. The PAL 210 may be implemented in the form of a software module and mounted in a part of the USB device or the USB host.

The WiFi EDCA unit 100 receives USB data whose priority is determined (or which is assigned with an AC) from the PAL 210 and wirelessly transmits the USB data using the EDCA scheme. That is, the WiFi EDCA unit 100 performs a transmission operation of a Media Access Control (MAC) layer according to the method described with reference to FIG. 1, and then wirelessly transmits the USB data through a WiFi Physical (PHY) layer 220.

The following description proposes a method for determining a priority for each USB data type and assigning an AC to be used for transmission to apply WiFi EDCA in transmission of USB data of various types.

A method for applying USB data to the EDCA scheme according to a first embodiment of the present disclosure will be described with reference to FIG. 3.

Figure 3:
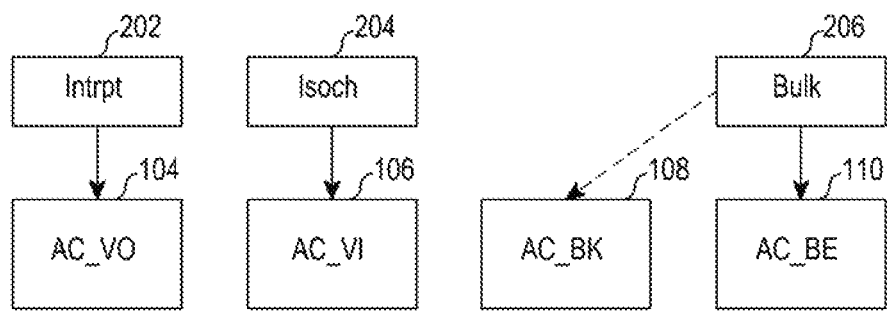
FIG. 3 is a schematic diagram illustrating a method for determining a priority of USB data and assigning an AC according to a first embodiment of the present disclosure.

FIG. 3 is a schematic diagram illustrating a method for determining a priority of USB data and assigning an AC according to a first embodiment of the present disclosure.

The PAL (or the QoS manager in the PAL) may assign a priority of USB data like a priority based on which a bandwidth is assigned in a USB superframe. Superframe bandwidth assignment for data transmission in the USB superframe is performed in the order of interrupt data, isochronous data, and bulk data. Likewise, for application of the WiFi EDCA scheme to USB data, interrupt data has the highest priority, isochronous data has the next highest priority, and bulk data has the lowest priority. Such an assigning method may be referred to as a top-down approach method.

The interrupt data 202 having the highest priority is assigned to use an AC_VO 104, the isochronous data 204 having the next highest priority is assigned to use an AC_VI 106, and the bulk data 206 having the lowest priority is assigned to use an AC_BE 110. Selectively, the bulk data 206 may be assigned to use an AC_BK 108.

Since the bulk data 206 is delay-tolerant, it is assigned with an AC having the lowest priority, whereas an AC, which supports a low transmission speed, such as the AC_BE 110, may not be assigned with sufficient resources used for transmission of the bulk data 206. If a problem occurs in a wireless transmission environment, it is highly probable that data drop occurs in the AC such as the AC_BE 110, such that for the bulk data 206 that needs complete transmission of whole data, transmission failure and frequent retransmission are highly likely to occur.

A method for applying USB data to the EDCA scheme according to a second embodiment of the present disclosure will be described with reference to FIG. 4.

Figure 4:
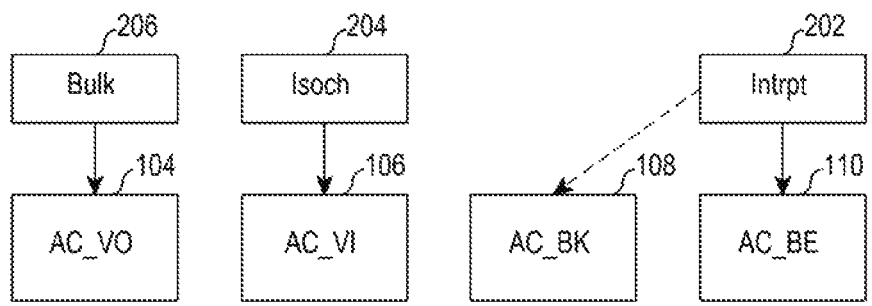
FIG. 4 is a schematic diagram illustrating a method for determining a priority of USB data and assigning an AC according to a second embodiment of the present disclosure.

FIG. 4 is a diagram illustrating a method for determining a priority of USB data and assigning an AC according to the second embodiment of the present disclosure.

The PAL (or the QoS manager in the PAL) handles bulk data, which places a high importance on data integrity, as the most important data and assigns priorities to USB data. That is, priorities of USB data for WiFi EDCA application are such that the bulk data has the highest priority, the isochronous data has the next highest priority, and the interrupt data has the lowest priority. Such an assigning method may be referred to as a bottom-up approach method.

The bulk data 206 having the highest priority is assigned to use the AC_VO 104, the isochronous data 204 having the next highest priority is assigned to use the AC_VI 106, and the interrupt data 202 having the lowest priority is assigned to use the AC_BE 110. Selectively, the interrupt data 202 may be assigned to use the AC_BK 108.

The interrupt data 202 is error-tolerant, and thus is assigned to the AC having the lowest priority, but the AC, such as the AC_BE 110, supports a low transmission speed and thus may not sufficiently satisfy requirements of the interrupt data 202 that is not error-tolerant.

The second and third embodiments of the present disclosure statically assign particular USB data to a particular AC.

Thus, in spite of a free space in a transmission resource (for example, an AC) that is not assigned to the particular USB data, the particular USB data cannot use the non-assigned transmission resource, resulting in unbalanced or inefficient resource use.

A method for applying USB data to the EDCA scheme according to a third embodiment of the present disclosure will be described. The third embodiment of the present disclosure involves a scheme for dynamically determining a priority of USB data to be transmitted through an AC according to the EDCA scheme.

Figure 5:
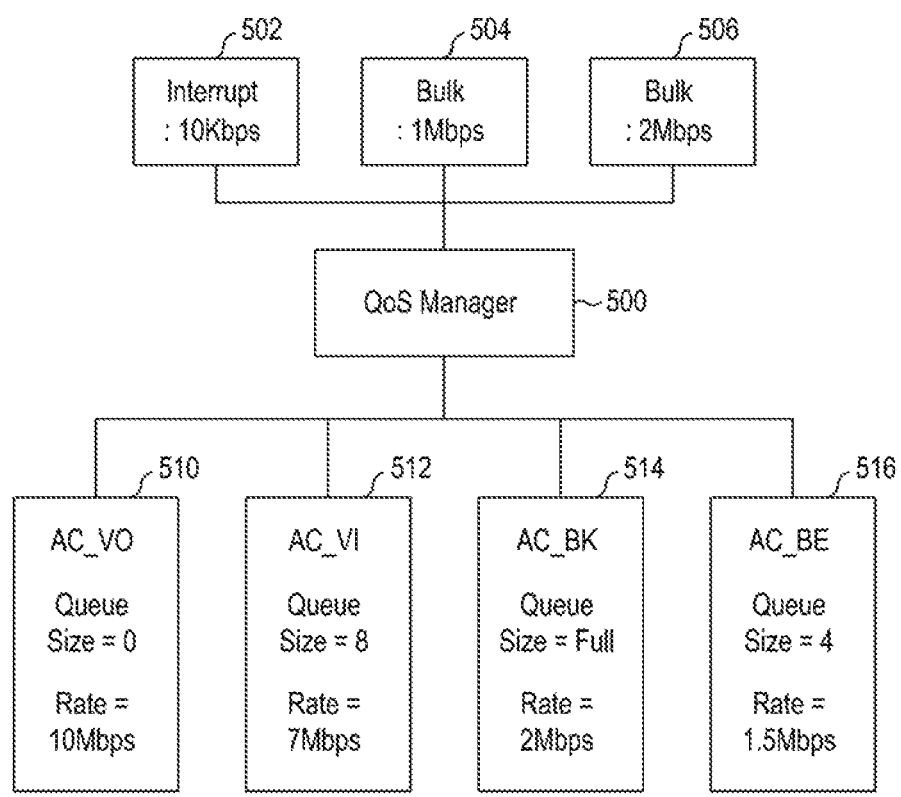
FIG. 5 is a schematic diagram illustrating an exemplary scenario for dynamically determining a priority of USB data according to a third embodiment of the present disclosure.

FIG. 5 is a schematic diagram illustrating an exemplary scenario for dynamically determining a priority of USB data according to a third embodiment of the present disclosure.

Referring to FIG. 5, it is assumed that interrupt data 502 requiring a minimum Tx rate of 10 Kbps, bulk data 504 requiring a minimum Tx rate of 1 Mbps, and bulk data 506 requiring a minimum Tx rate of 2 Mbps exist as USB data to be transmitted.

A QoS manager 500 provided in a PAL applies the highest priority to the interrupt data 502 to determine whether transmission through an AC_VO 510 is possible.

More specifically, the QoS manager 500 determines that the interrupt data 502 may be queued in the AC_VO 510 because the queue size of the AC_VO 510 is 0 (that is, not full), and determines that transmission through the AC_VO 510 is possible because the Tx rate of 10 Mbps provided by the AC_VO 510 is higher than a required Tx rate, 10 Kbps, of the interrupt data 502. Thus, the QoS manager 500 applies the highest priority to the interrupt data 502 to assign the interrupt data 502 to the AC_VO 510.

The QoS manager 500 gives the lowest priority to the bulk data 504 requiring a minimum Tx rate of 1 Mbps to control the bulk data 504 to be transmitted through the AC_BE 516.

More specifically, the QoS manager 500 determines that the bulk data 504 may be queued in the AC_BE 516 because the queue size of the AC_BE 510 is 4 (that is, not full), and determines that transmission through the AC_BE 516 is possible because a Tx rate of 1.5 Mbps provided by the AC_BE 516 is higher than a required Tx rate, 1 Mbps, of the bulk data 504. Thus, the QoS manager 500 gives the lowest priority to the bulk data 504 to assign the bulk data 504 to the AC_BE 516.

The QoS manager 500 may give another priority to the bulk data 506 requiring a Tx rate of 2 Mbps to control the bulk data 506 to be transmitted through the AC_VI 512.

More specifically, the QoS manager 500 determines whether transmission through the AC_BK 514 having the next highest priority than the AC_BE 516 is possible because the Tx rate of 1.5 Mbps provided by the AC_BE 516 is lower than a required Tx rate, 2 Mbps, of the bulk data 506. However, since the current queue size of the AC_BK 514 is 'full', the QoS manager 500 determines that transmission through the AC_BK 514 is not possible, and determines whether transmission through the AC_VI 512 having the next highest priority than the AC_BK 514 is possible. The queue size of the AC_VI 512 is not 'full' and the Tx rate, 7 Mbps, of the AC_VI 512 is higher than the required Tx rate, 2 Mbps, of the BULK data 504, such that the QoS manager 500 controls the bulk data 504 to be transmitted through the AC_VI 512.

Figure 6:
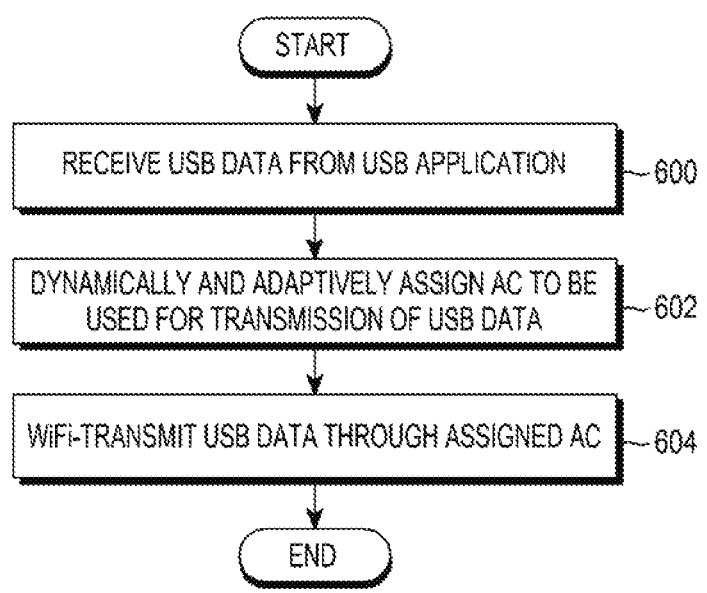
FIG. 6 is a flowchart illustrating a scheme for dynamic adaptive transmission of USB data according to the third embodiment of the present disclosure.

FIG. 6 is a flowchart illustrating a scheme for dynamic adaptive transmission of USB data according to the third embodiment of the present disclosure.

The PAL receives USB data from an USB application in step 600.

The PAL dynamically assigns an AC to be used for transmission of the received USB data in step 602.

The PAL delivers the USB data assigned with the AC to the WiFi EDCA unit which then transmits the received USB data using the assigned AC through WiFi in step 604.

A description will now be made of a method for the PAL (or the QoS manager in the PAL) to dynamically assign an AC to be used for transmission of USB data.

Selectively, before USB data is delivered to the WiFi EDCA unit from the PAL for wireless transmission, the PAL (for example, the QoS manager) may re-calculate priorities of the USB data. Calculation of the priorities of the USB data may be calculation of QoS Traffic IDs (QoS TIDs) of the USB data.

The PAL assigns ACs through which the USB data are to be transmitted based on the following criteria.

(Criterion 1) The PAL preferentially assigns USB data (for example, interrupt data and isochronous data) having a time requirement of having to be transmitted within a predetermined time to the AC_VO. If the AC_VO is not available because of a 'full' queue size of the AC_VO or for any other reasons, the PAL checks a state of a queue of an AC having the next lowest priority (that is, in the order of the AC_VI, the AC_BK, and the AC_BE) to determine an AC to be used. That is, the PAL may check the state of the queue of an AC to determine whether the AC is available.

(Criterion 2) The PAL preferentially assigns BULK data to the AC_BE. If the queue size of the AC_BE is 'full' or the Tx rate of the AC_BE is lower than the required Tx rate of the USB data, the PAL checks a state of a queue of an AC having the next highest priority (that is, in the order of AC_BK, AC_VI, and AC_VO) to determine an AC to be used. That is, the PAL may check the state of the queue of an AC to determine whether the AC is available.

Checking a state of a queue of a particular AC to determine whether the AC is available may include checking a bandwidth provided by the queue of the AC or checking a size of packets accumulated in the queue of the AC.

First, a description will be made of checking the bandwidth provided by the queue of the AC.

Checking the bandwidth provided by the queue of the AC involves assigning an AC having the next highest priority if a bandwidth of a particular AC is too small for transmission of USB data through the particular AC to satisfy predetermined requirements, thus achieving QoS-based dynamic adaptation.

Checking the bandwidth provided by the queue of the AC includes determining whether the AC currently supports a minimum Tx rate required by USB data. To this end, the checking needs to be performed first with respect to an AC having a lower Tx rate. Thus, bandwidth checking is performed first with respect to a queue of an AC having a low priority (thus having a low Tx rate), and if the bandwidth fails to satisfy particular requirements, bandwidth checking is then performed with respect to a queue of another AC having a higher priority.

A bandwidth of a queue of an $i_{th}$ AC may be calculated using Equation (1).

MathFigure 1

$$BW[i] = \frac{PacketSize\ (Kb)}{TS_{ACK} - TS_{RX}(\text{Sec})} \qquad \text{[Math. 1]}$$

wherein $TS_{RX}$ represents a timestamp at a point in time when the queue of the $i_{th}$ AC receives data and has a unit of second (sec), $TS_{ACK}$ represents a timestamp at a point in time when an Acknowledge (ACK) message is received in response to data after the queue of the $i_{th}$ AC transmits the data, and PacketSize represents the size of the data transmitted from the queue of the $i_{th}$ AC, that is, a packet size, and has a unit of kilobit (Kb).

The calculated bandwidth may be used as a bandwidth estimated through a weighted average operation. A Bandwidth Estimated (BE) of the queue of the $i_{th}$ AC may be calculated using Equation (2).

MathFigure 2

$$BW_{estimated}[i]=(1-a)*BW_{estimated}[i]+c*BW[i] \quad [\text{Math.2}]$$

wherein BW[i] represents a bandwidth of the queue of the $i_{th}$ AC calculated using Equation (1), and a represents a weighted value between 0 and 1.

Next, a description will be made of an operation of determining whether the bandwidth satisfies the particular requirements.

The PAL calculates a bit rate threshold (hereinafter, referred to as 'bit_rate_thres') of USB data to be transmitted, and determines whether the calculated (or estimated) bandwidth of the queue of the $i_{th}$ AC, $BW_i$, is larger than the calculated bit_rate_thres.

More specifically, if $BW_i$ is larger than bit_rate_thres, the PAL assigns the $i_{th}$ AC to the USB data for transmission of the USB data through the $i_{th}$ AC. However, if $BW_i$ is smaller than or equal to bit_rate_thres, the PAL does not transmit the USB data through the $i_{th}$ AC, calculates a bandwidth $BW_{i+1}$ for a queue of a next-highest priority (that is, $(i+1)_{th}$) AC having a higher Tx rate, and determines whether the USB data is to be transmitted through the $(i+1)_{th}$ AC by comparing the calculated $BW_{i+1}$ with bit_rate_thres.

For example, in the EDCA scheme, the $i_{th}$ AC is AC_BE for i=1, the $i_{th}$ AC is AC_BK for i=2, the $i_{th}$ AC is AC_VI for i=3, and the $i_{th}$ AC is AC_VO for i=4.

bit_rate_thres may be calculated using Equation (3).

MathFigure 3

$$\text{bit\_rate\_thres} = \text{packet}_{size} * \text{packets\_in\_buffer} * \frac{1000}{\text{buffer\_time\_thres(ms)}} \quad [\text{Math. 3}]$$

wherein $\text{packet}_{size}$ represents a size of a unit transmission packet, packets_in_buffer represents the number of packets of the USB data stored in a Tx buffer of the PAL, and buffer_time_thres represents a threshold time in which the USB data is stored in the buffer. That is, as buffer_time_thres is smaller, a time for which the USB data is buffered needs to be shorter and to reduce the buffering time, the USB data needs to have the requirement of large bit_rate_thres.

However, the bit Tx rate threshold bit_rate_thres is not necessarily calculated using Equation (3) and may be calculated differently case by case.

According to (Criterion 2), an AC having a low Tx rate is preferentially assigned to bulk data, such that checking the bandwidth may be performed first with respect to the AC_BE, particularly for the bulk data.

Selectively, selection of the AC to be used by the bulk data in the process of checking the bandwidth may be limited within the AC_BE, the AC_BK, and the AC_VI. That is, a previous limitation is applied such that the bulk data is not assigned to the AC_VO, and in this way, the use of the AC_VO by the delay-sensitive interrupt data may be guaranteed.

Second, checking a size of packets accumulated in a queue of an AC will be described.

In the operation of checking a size of packets accumulated in a queue of an AC, when transmission of USB through the AC is not smooth because of a large queue size, an AC having the next lowest priority is used for dynamic adaptation using QoS.

In the operation of checking the size of packets accumulated in a queue of an AC, if there are too many packets accumulated in the queue of the AC, another AC having a low Tx rate is assigned to smoothly transmit USB data, and to this end, the checking operation needs to be performed in an order from an AC having the highest Tx rate to an AC having the lowest Tx rate. Thus, checking the size of packets accumulated in a queue is performed with respect to a queue of an AC, and if the size of packets accumulated in the queue of the AC fails to satisfy a predetermined condition, the checking may be performed with respect to another AC having the next lowest priority (thus having a low Tx rate).

For the BULK data, the PAL determines whether a size of a queue of the $i_{th}$ AC, $queue_i$, is smaller than a result of applying an adjustment value β to a maximum queue size $maxqueuesize_i$, thus determining whether to assign the $i_{th}$ AC. A criterion for determining whether to assign the $i_{th}$ AC to the bulk data may be expressed as Equation (4).

MathFigure 4

$$queue_i < maxquesize_i/\beta \quad [\text{Math.4}]$$

wherein β represents an adjustment value for a maximum queue size applied to bulk data, and may be, for example, 4 (that is an experimentally determined value) or 5 (that is determined from a division size of a USB MAC frame). As such, to secure a free space in a queue of a particular AC for the interrupt data or isochronous data having higher priorities, the adjustment value is applied to apply a small maximum queue size of the particular AC for the bulk data.

More specifically, if $queue_i$ is smaller than $maxqueuesize_i/\beta$, the PAL may assign the $i_{th}$ AC to transmit the bulk data through the $i_{th}$ AC. However, if $queue_i$ is greater than or equal to $maxqueuesize_i/\beta$, the PAL checks a packet size of a queue of an AC having the next lowest priority (that is, an $(i-1)_{th}$ AC) to determine whether to transmit the bulk data through the $(i-1)_{th}$ AC.

For the isochronous data, the PAL determines whether the size of the queue of the $i_{th}$ AC, $queue_i$, is smaller than a value of applying an adjustment value γ to $maxqueuesize_i$ to determine whether to assign the $i_{th}$ AC. A criterion for determining whether to assign the $i_{th}$ AC to the isochronous data may be expressed as Equation (5).

MathFigure 5

$$queue_i < maxquesize_i/\gamma \quad [\text{Math.5}]$$

wherein γ represents a maximum queue size applied to the isochronous data, and may be, for example, 2 (that is an experimentally determined value) or 1 (that is a value determined from a division size of an USB MAC frame). As such, to secure a free space in a queue of a particular AC for the interrupt data having the higher priority, the adjustment value is applied to apply a small maximum queue size of the particular AC for the isochronous data.

More specifically, if $queue_i$ is smaller than $maxqueuesize_i/\gamma$, the PAL may assign the $i_{th}$ AC to the isochronous data for transmission of the isochronous data through the $i_{th}$ AC. However, if $queue_i$ is greater than or equal to $maxqueuesize_i/\gamma$, the PAL checks a size of packets accumulated in a queue of an AC having the next lowest priority (that is, the $(i-1)_{th}$ AC) to determine whether to transmit the isochronous data through the $(i-1)_{th}$ AC.

Selectively, selection of an AC to be assigned to the isochronous data in the process of checking the packet size of the queue may be limited within the AC_VO, the AC_VI and the AC_BK. That is, a previous limitation is applied such that the AC_BE is not used for the isochronous data because the AC_BE may not guarantee a predetermined Tx rate due to a low priority, and nevertheless, if the AC_BE is used for transmission of the isochronous, the quality of a service such as streaming may be degraded.

For the interrupt data (having the highest priority), since it is not necessary to secure a free space for other USB data in a queue of a particular AC, and thus an adjustment is not applied to a maximum queue size of the queue of the particular AC, which is used as the determination criterion. That is, the PAL may determine to assign the $i_{th}$ AC to the interrupt data based on a condition provided by Equation (6).

MathFigure 6

$$queue_i < maxquesize_i \qquad [Math.6]$$

If $queue_i$ is smaller than $maxqueuesize_i$, the PAL may assign the $i_{th}$ AC to the interrupt data for transmission of the interrupt data through the $i_{th}$ AC. However, if $queue_i$ is equal to $maxqueuesize_i$, the PAL checks a packet size of a queue of an AC having the next lowest priority (that is, the $(i-1)_{th}$ AC) to determine whether to transmit the interrupt data through the $(i-1)_{th}$ AC.

Selectively, selection of the AC to be used by the interrupt data in the process of checking the packet size of the queue may be limited within the AC_VO, the AC_VI, and the AC_BK. That is, a previous limitation is applied such that the interrupt data is not used in the AC_BE, and if the interrupt data is used in the AC_BE which may not guarantee a predetermined Tx rate due to a low priority, an USB application that needs instant data transmission may not be normally driven.

Selectively, the operation of checking the packet size of the queue of the AC may be performed together with the foregoing operation of checking the bandwidth of the queue of the AC. That is, the first AC for which the packet size of the queue of the AC is checked may be the AC determined by checking the bandwidth of the AC.

Figure 7A:
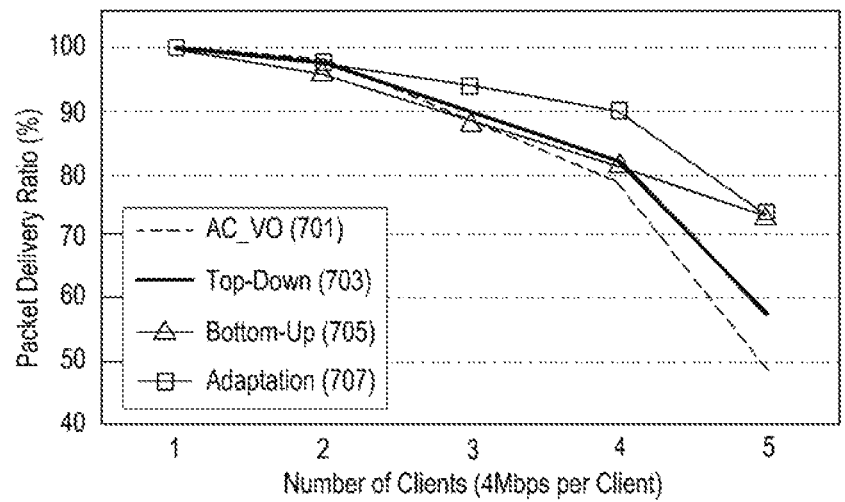
FIGS. 7*a* to 7*c* are graphs showing packet delivery ratio test results in transmission of bulk data, transmission of interrupt data, and transmission of isochronous data according to embodiments of the present disclosure.
Figure 7B:
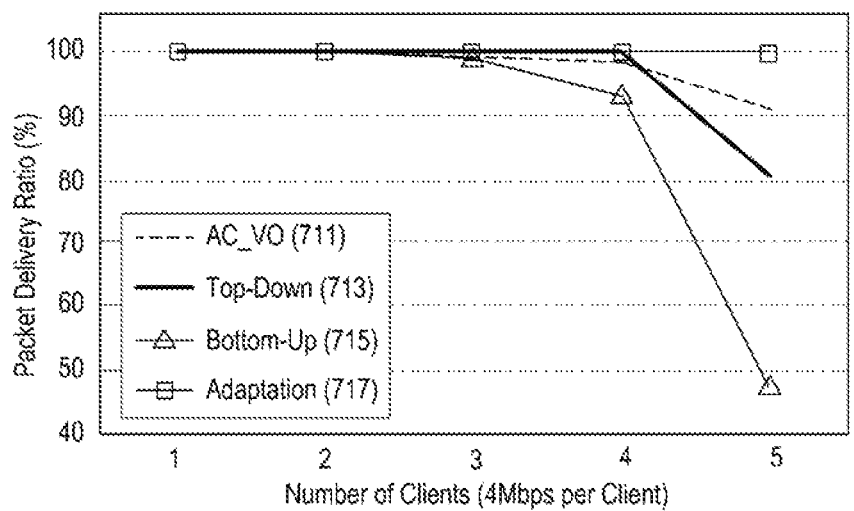
Figure 7C:
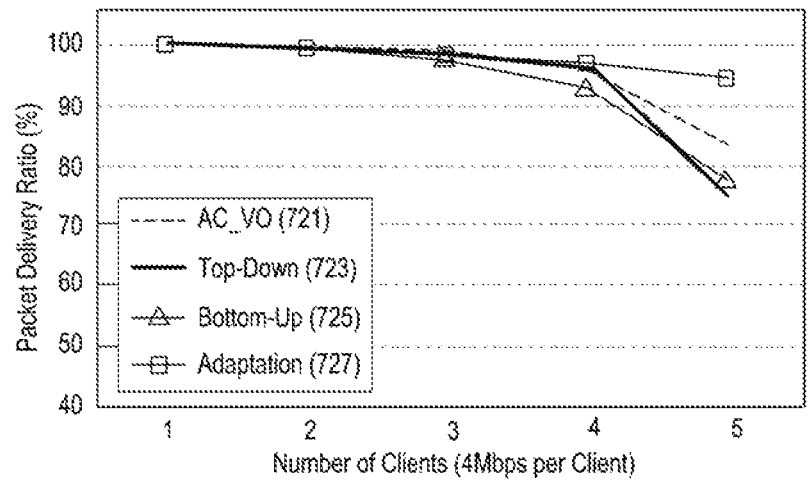

FIGS. 7a to 7c are graphs showing packet delivery ratio test results in transmission of bulk data, transmission of interrupt data, and transmission of isochronous data according to embodiments of the present disclosure.

In FIGS. 7a to 7c, tests were carried out in four conditions with respect to bulk data (FIG. 7a), interrupt data (FIG. 7b), and isochronous data (FIG. 7c), respectively. In the graphs, an x-axis denotes the number of clients that transmit USB data through WiFi and a y-axis denotes a packet delivery ratio (%). The packet delivery ratio may be defined as a ratio of the total number of received packets to the total number of transmitted packets.

Among the four conditions, the first condition is that three types of USB data are transmitted within the limited AC_VO, and test results in this condition are indicated by reference numerals 701 for bulk data, 711 for interrupt data, and 721 for isochronous data in FIGS. 7a, 7b, and 7c.

The second condition is that the three types of USB data are transmitted using the first embodiment (top-down approach method) of the present disclosure, and test results in this condition are indicated by reference numerals 703 for bulk data, 713 for interrupt data, and 723 for isochronous data in FIGS. 7a, 7b, and 7c.

The third condition is that the three types of USB data are transmitted using the second embodiment (bottom-up approach method) of the present disclosure, and test results in this condition are indicated by reference numerals 705 for bulk data, 715 for interrupt data, and 725 for isochronous data in FIGS. 7a, 7b, and 7c.

The fourth condition is that the three types of USB data are transmitted using the third embodiment (dynamic adaptation method) of the present disclosure, and test results in this condition are indicated by reference numerals 707 for bulk data, 717 for interrupt data, and 727 for isochronous data in FIGS. 7a, 7b, and 7c.

Referring to FIG. 7a, the result 707 based on the third embodiment of the present disclosure shows the best performance for the bulk data. That is, when compared to the result 701 based on only the AC_VO, the result 707 based on the third embodiment of the present disclosure is improved by about 15% on average. Also in comparison to the result 703 based on the first embodiment of the present disclosure, the result 707 based on the third embodiment of the present disclosure is improved by about 10% on average.

For the bulk data, the result 705 based on the second embodiment of the present disclosure shows performance that is similar to the result 707 based on the third embodiment of the present disclosure. However, referring to FIGS. 7b and 7c, the third embodiment of the present disclosure shows a significantly superior delivery ratio over other embodiments in terms of test results for the interrupt data and the isochronous data.

These results come from a feature that the third embodiment of the present disclosure dynamically and adaptively uses a radio resource (for example, an AC) taking QoS into account, thereby reducing congestion in a transmission queue and reducing collision between transmission USB data.

Figure 8A:
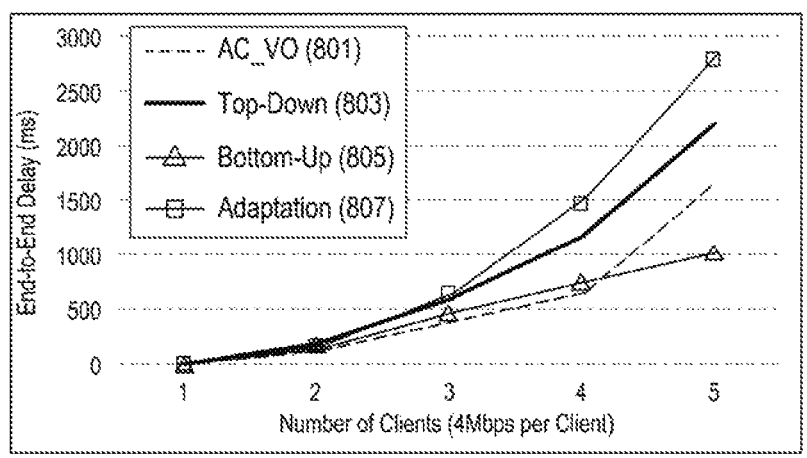
FIGS. 8*a* to 8*c* are graphs showing end-to-end delay test results in transmission of bulk data, transmission of interrupt data, and transmission of isochronous data according to embodiments of the present disclosure.
Figure 8B:
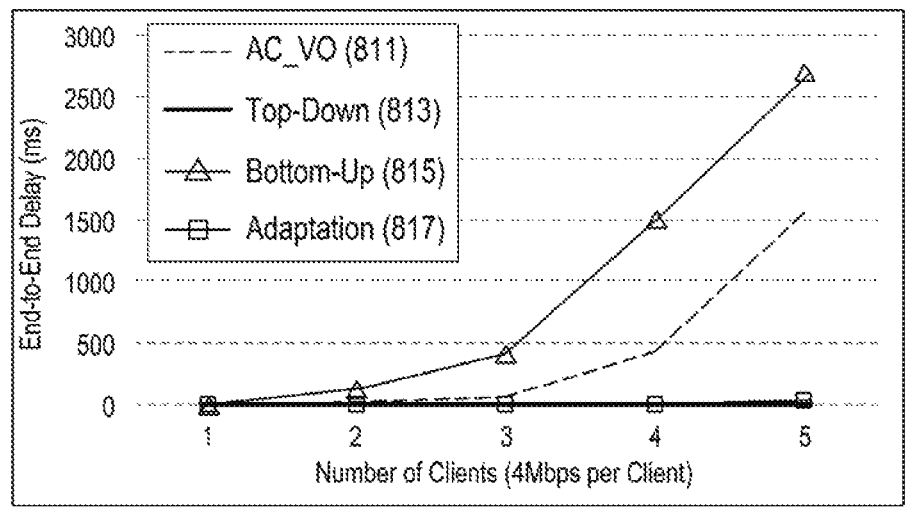
Figure 8C:
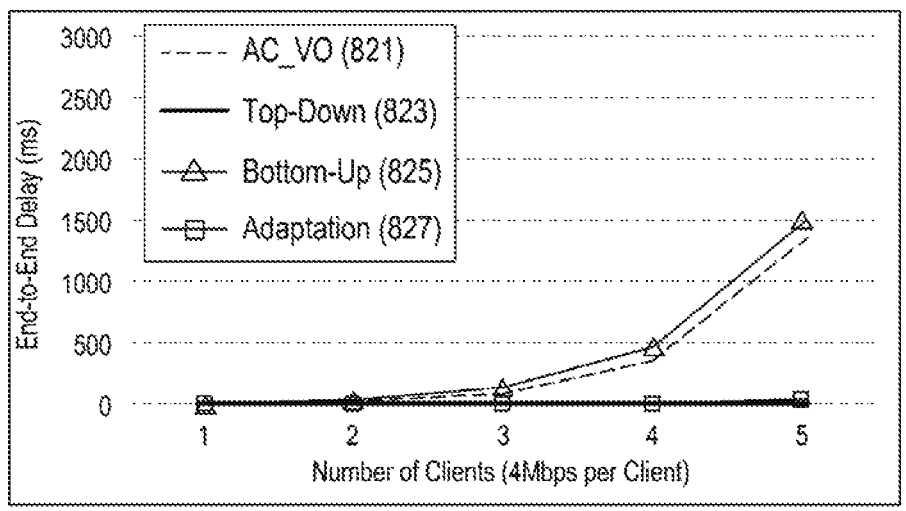

FIGS. 8a to 8c are graphs showing end-to-end delay test results in transmission of bulk data, transmission of interrupt data, and transmission of isochronous data according to embodiments of the present disclosure.

In FIGS. 8a to 8c, tests were carried out in four conditions with respect to bulk data (FIG. 8a), interrupt data (FIG. 8b), and isochronous data (FIG. 8c), respectively. In the graphs, an x-axis denotes the number of clients that transmit USB data through WiFi and a y-axis denotes an end-to-end delay (in the unit of ms).

Among the four conditions used in FIGS. 8a to 8c, the first condition is that the three types of USB data are transmitted within the limited AC_VO, and test results in this condition are indicated by reference numerals 801 for bulk data, 811 for interrupt data, and 821 isochronous data in FIGS. 8a, 8b, and 8c.

The second condition is that the three types of USB data are transmitted using the first embodiment (top-down approach method) of the present disclosure, and test results in this condition are indicated by reference numerals 803 for bulk data, 813 for interrupt data, and 823 isochronous data in FIGS. 8a, 8b, and 8c.

The third condition is that the three types of USB data are transmitted using the second embodiment (bottom-up approach method) of the present disclosure, and test results in this condition are indicated by reference numerals 805 for bulk data, 815 for interrupt data, and 825 isochronous data in FIGS. 8a, 8b, and 8c.

The fourth condition is that the three types of USB data are transmitted using the third embodiment (dynamic adaptation method) of the present disclosure, and test results in this condition are indicated by reference numerals 807 for bulk data, 817 for interrupt data, and 827 isochronous data in FIGS. 8a, 8b, and 8c.

Referring to FIG. 8a, the result 807 based on the third embodiment of the present disclosure has the longest end-to-end delay for the bulk data. However, the bulk data is not sensitive to delay (that is, time-tolerant), such that an increase in time delay does not affect a transmission service of the bulk data.

Referring to FIGS. 8b and 8c, the results 817 and 827 based on the third embodiment of the present disclosure show time delays that are similar to the results 813 and 823 based on the first embodiment (top-down approach method) of the present disclosure. That is, the results 817 and 827 based on the third embodiment of the present disclosure show the smallest time delay for the interrupt data and the isochronous data.

As a result, the third embodiment of the present disclosure guarantees a high Tx rate for bulk data that places a high importance on a data Tx success rate while providing the smallest time delay for interrupt data and isochronous data that are sensitive to time delay.

In addition, when the third embodiment of the present disclosure is applied, occurrence of low jitter is guaranteed in transmission of isochronous data like webcam data and interrupt data like mouse signal data, thereby guaranteeing a smooth operation of a USB application.

It should be noted that the diagram illustrating the transmitting method and apparatus, the AC assigning method, and the dynamic adaptation method provided in FIGS. 2 to 6 are not intended to limit the scope of the present disclosure. That is, all components or steps shown in FIGS. 2 to 6 should not be interpreted as essential elements for carrying out the present disclosure, and the present disclosure may be implemented with some of the components or steps in a range that does not adversely affect the nature of the present disclosure.

The above-described operations may be implemented by including a memory device storing a program code in a component of a USB device or a USB host. That is, each component of the USB device or the USB host may perform the above-described operations by reading and executing the program code stored in the memory device using a processor or a Central Processing Unit (CPU).

Various components and modules of the USB device or the USB host described herein may operate by using a hardware circuit such as a Complementary Metal Oxide Semiconductor (CMOS)-based logic circuit, firmware, software, and/or a combination of hardware and firmware and/or software inserted into a machine-readable medium. For example, various electric structures and methods may be implemented using electric circuits such as transistors, logic gates, and on-demand semiconductors.

While the present disclosure has been particularly shown and described with reference to embodiments thereof, it will be understood by those of ordinary skill in the art that various changes in form and details may be made therein without departing from the spirit and scope of the present disclosure as defined by the following claims.

The invention claimed is:

1. A method for wirelessly transmitting Universal Serial Bus (USB) application data by using an Enhanced Distributed Channel Access (EDCA) scheme that uses one or more Access Channels (ACs) having different priorities, the method comprising:
   receiving one or more USB application data from an USB application;
   assigning an AC through which the USB application data is to be transmitted; and
   transmitting the USB application data through the assigned AC,
   wherein the assigning of the AC comprises determining whether a size of packets queued in a queue of the AC is smaller than a predetermined queue size for the USB application data in the queue of the AC,
   wherein the USB application data comprises at least one of interrupt data, isochronous data, and bulk data,
   wherein if the USB application data comprises the isochronous data or the bulk data, the predetermined queue size for the USB application data corresponds to a value of dividing a maximum queue size of the queue of the AC by an adjustment value associated with the USB application data, and
   wherein if the USB application data comprises the interrupt data, the predetermined queue size for the USB application data corresponds to the maximum queue size of the queue of the AC.

2. The method of claim 1, wherein the AC comprises at least one of AC_VO (Voice), AC_VI (Video), AC_BK (Background), and AC_BE (Best Effort).

3. The method of claim 2, wherein the bulk data is firstly assigned to the AC_BE.

4. The method of claim 2, wherein the interrupt data or the isochronous data is firstly assigned to the AC_VO.

5. The method of claim 2, wherein the interrupt data is assigned to one or more ACs among the AC_VO, the AC_VI, and the AC_BK.

6. The method of claim 2, wherein the bulk data is assigned to one or more ACs among the AC_BE, the AC_BK, and the AC_VI.

7. The method of claim 1, wherein the assigning of the AC further comprises:
   determining whether a bandwidth of the queue of the AC is larger than a bit rate threshold of the USB application data;
   assigning the AC for transmission of the USB application data, if determining that the bandwidth of the queue of the AC is larger than the bit rate threshold of the USB application data; and
   checking a bandwidth of an AC having a priority higher than the AC without assigning the AC for transmission of the USB application data, if determining that the bandwidth of the queue of the AC is smaller than or equal to the bit rate threshold of the USB application data.

8. The method of claim 1, wherein the assigning of the AC further comprises:
   assigning the AC for transmission of the USB application data, if determining that the size of the packets queued in the queue of the AC is smaller than a predetermined queue size for the USB application; and
   checking a size of packets queued in a queue of an AC having a priority lower than the AC without assigning the AC for transmission of the USB application data, if determining that the size of the packets queued in the queue of the AC is equal to or larger than the predetermined queue size for the USB application.

9. An apparatus for wirelessly transmitting Universal Serial Bus (USB) application data by using an Enhanced Distributed Channel Access (EDCA) scheme that uses one or more Access Channels (ACs) having different priorities, the apparatus comprising:
   a Protocol Adaptation Layer (PAL) configured to receive one or more USB application data from an USB application and assign an AC through which the USB application data is to be transmitted; and a Wireless Fidelity (WiFi) EDCA unit configured to transmit the USB application data through the assigned AC, wherein the assigning of the AC comprises determining whether a size of packets queued in a queue of the AC is smaller than a predetermined queue size for the USB application data in the queue of the AC, wherein the USB application data comprises at least one of interrupt data, isochronous data, and bulk data, wherein if the USB application data comprises the isochronous data or the bulk data, the predetermined queue size for the USB application data corresponds to a value of dividing a maximum queue size of the queue of the AC by an adjustment value associated with the USB application data, and wherein if the USB application data comprises the interrupt data, the predetermined queue size for the USB application data corresponds to the maximum queue size of the queue of the AC.

10. The apparatus of claim 9, wherein the AC comprises at least one of AC_VO (Voice), AC_VI (Video), AC_BK (Background), and AC_BE (Best Effort).

11. The apparatus of claim 10, wherein the bulk data is firstly assigned to the AC_BE.

12. The apparatus of claim 10, wherein the interrupt data or the isochronous data is firstly assigned to the AC_VO.

13. The apparatus of claim 10, wherein the apparatus is a module provided in a USB device or a USB host.

14. The apparatus of claim 10, wherein the interrupt data is assigned to one or more ACs among the AC_VO, the AC_VI, and the AC_BK.

15. The apparatus of claim 10, wherein the bulk data is assigned to one or more ACs among the AC_BE, the AC_BK, and the AC_VI.

16. The apparatus of claim 9, wherein the PAL is further configured to determine whether a bandwidth of the queue of the AC is larger than a bit rate threshold of the USB application data, assign the AC for transmission of the USB application data, if determining that the bandwidth of the queue of the AC is larger than the bit rate threshold of the USB application data, and check a bandwidth of an AC having a priority higher than the AC without assigning the AC for transmission of the USB application data, if determining that the bandwidth of the queue of the AC is smaller than or equal to the bit rate threshold of the USB application data.

17. The apparatus of claim 9, wherein the PAL is further configured to assign the AC for transmission of the USB application data, if determining that the size of the packets queued in the queue of the AC is smaller than a predetermined queue size of for the USB application data, and check a size of packets queued in a queue of an AC having a priority lower than the AC without assigning the AC for transmission of the USB application data, if determining that the size of the packets queued in the queue of the AC is equal to or larger than the predetermined queue size for the USB application data.

* * * * *